(12) United States Patent
Schmidt et al.

(10) Patent No.: US 7,270,524 B2
(45) Date of Patent: Sep. 18, 2007

(54) PRESSURE MEASURING DEVICE FOR AN INJECTION MOLDING MACHINE

(75) Inventors: Holger Schmidt, Bad Frankenhausen (DE); Dietmar Krosse, Wiehe (DE)

(73) Assignee: Demag Ergotech GmbH, Schwaig (DE)

( * ) Notice: Subject to any disclaimer, the term of this patent is extended or adjusted under 35 U.S.C. 154(b) by 375 days.

(21) Appl. No.: 10/918,195

(22) Filed: Aug. 13, 2004

(65) Prior Publication Data

US 2005/0058737 A1 Mar. 17, 2005

(30) Foreign Application Priority Data

Aug. 14, 2003 (DE) ................ 103 37 551

(51) Int. Cl.
*B29C 45/78* (2006.01)
(52) U.S. Cl. ...................... 425/149; 425/150
(58) Field of Classification Search ............... 425/145, 425/150, 149
See application file for complete search history.

(56) References Cited

U.S. PATENT DOCUMENTS 5,206,034 A 4/1993 Yamazaki
6,247,913 B1 6/2001 Shibuya et al.

FOREIGN PATENT DOCUMENTS

| DE | 199 50 534 A | 4/2000 |
|----|---|---|
| DE | 101 43 472 A | 4/2002 |
| DE | 101 04 659 A | 8/2002 |
| EP | 0 350 872 B1 | 9/1992 |
| EP | 1 162 053 A | 12/2001 |
| JP | 62 044417 A | 2/1987 |
| JP | 2003211506 A | 7/2003 |

*Primary Examiner*—Tim Heitbrink
(74) *Attorney, Agent, or Firm*—Henry M. Feiereisen

(57) ABSTRACT

A pressure measuring device for an injection molding machine having a plasticizing screw operated by a rotary drive and an injection drive includes a load detector having a deformation zone which forms part of a transmission member of the injection drive and is of reduced cross section, and a sensor. The deformation zone elastically deforms in response to a driving force acting on the transmission member, with the sensor measuring a change in shape of the deformation zone.

18 Claims, 1 Drawing Sheet

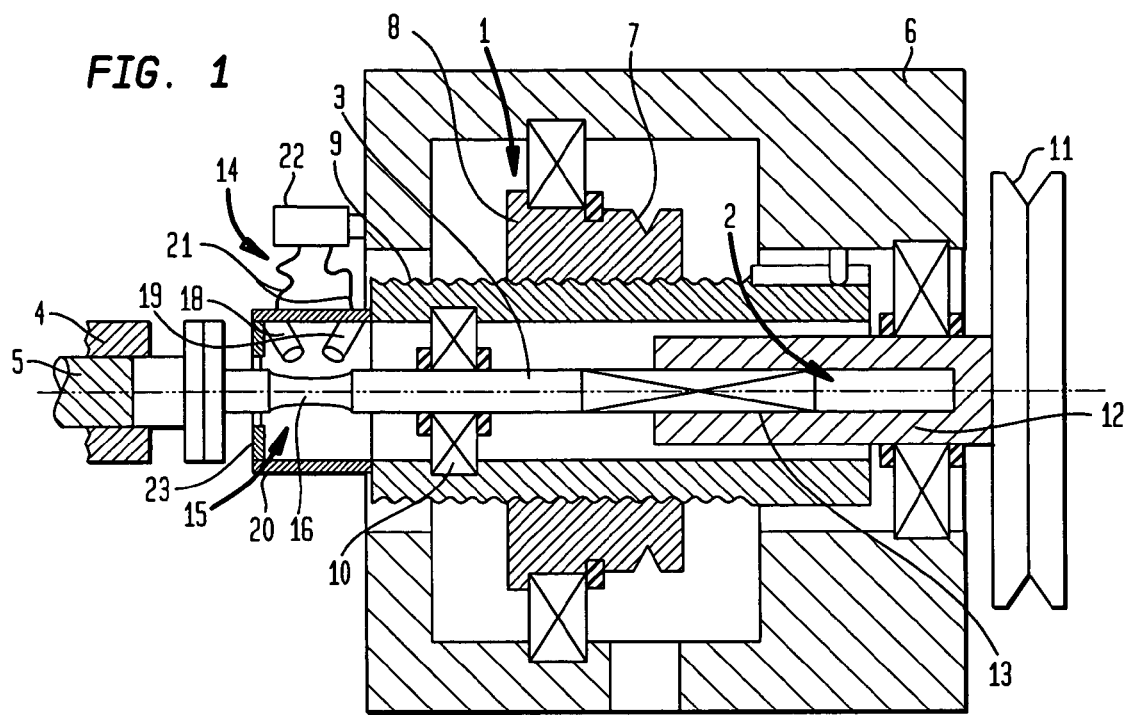
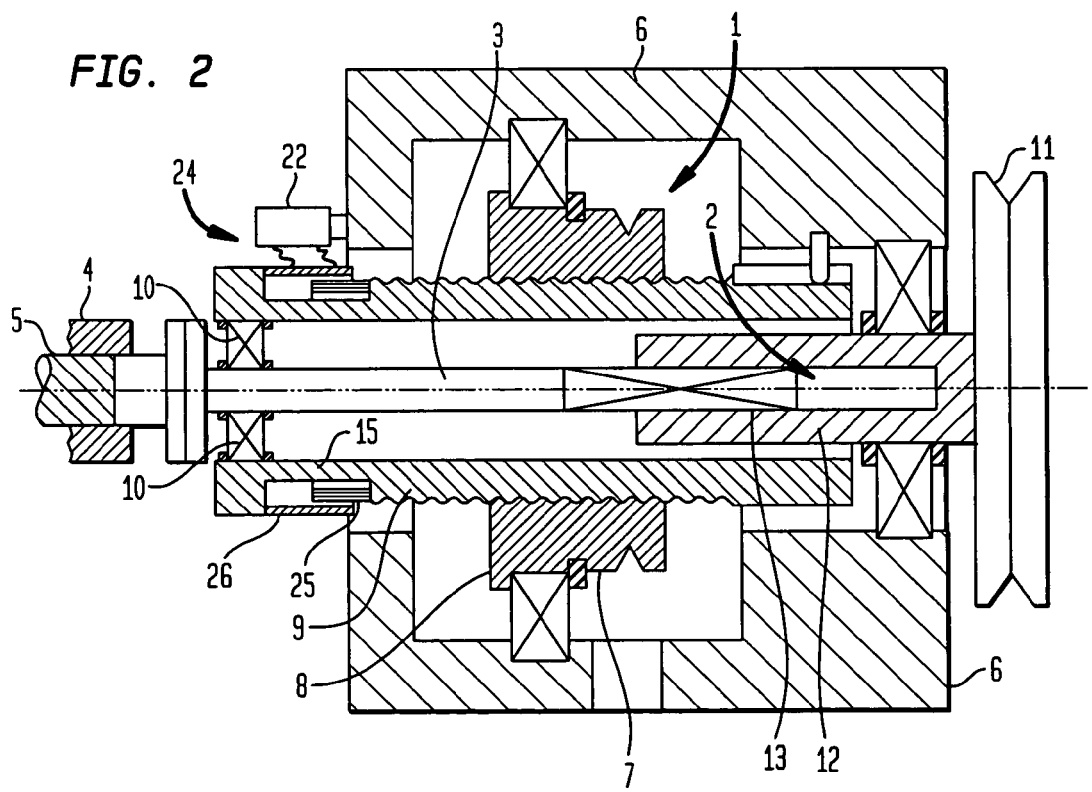

PRESSURE MEASURING DEVICE FOR AN INJECTION MOLDING MACHINE

CROSS-REFERENCES TO RELATED APPLICATIONS

This application claims the priority of German Patent Application, Serial No. 103 37 551.1, filed Aug. 14, 2003, pursuant to 35 U.S.C. 119(a)-(d), the disclosure of which is incorporated herein by reference.

BACKGROUND OF THE INVENTION

The present invention relates, in general, to a pressure measuring device for an injection molding machine.

Nothing in the following discussion of the state of the art is to be construed as an admission of prior art.

A typical injection molding machine includes an injection mold and an injection unit for injecting a shot of plastic melt into the injection mold. The injection unit is provided with a rotary drive to rotate a plasticizing screw for advancing plastic in a barrel while being plasticized, and an injection drive or thrust generator for axially moving the screw to thereby inject the shot into the adjacent injection mold. In order to measure the thrust applied on the plasticizing screw by the injection drive for determining the melt pressure of the plastic melt in the barrel, the use of a load detector has been proposed. Examples include European Patent specification EP 0 350 872 B1, U.S. Pat. Nos. 5,206,034 and 6,247,913. The load detector is hereby positioned in the drive train between the injection drive and the plasticizing screw and includes a force transmitting element, which elastically deforms when being subjected to the thrust, and a pickup device for measuring the deformation. Conventional load detectors suffer shortcomings because the force transmitting element is realized in the form of a separate mechanical and fairly expensive precision structure and because the integration of the measuring device inside the injection unit so that a replacement is only difficult to implement and time-consuming. When the load detector is placed directly in the driveshaft, which is coupled with the plasticizing screw, in the shaft region between driveshaft bearing and the plasticizing screw, the supply of auxiliary energy and the transmission of the measuring value is difficult to implement between the part that conjointly rotates with the driveshaft and the stationary part of the load detector.

It would therefore be desirable and advantageous to provide an improved pressure measuring device for an injection molding machine to obviate prior art shortcomings and to attain high precision in measurement while being simple in structure and reliable in operation.

SUMMARY OF THE INVENTION

According to one aspect of the present invention, a pressure measuring device for an injection molding machine having a plasticizing screw operated by a rotary drive and an injection drive, includes a load detector having a deformation zone which forms part of a transmission member of the injection drive and has a reduced cross section and which elastically deforms in response to a driving force acting on the transmission member, and a sensor for measuring a change in shape of the deformation zone.

The present invention resolves prior art problems by integrating the elastically deformable force transmitting element of the load detector in the transmission member of the injection drive so that the force transmitting element is axially upset or compressed when subjected to the thrust of the injection drive and thereby shortened and at the same time widened. The transmission member may hereby be a screw driveshaft having a cylindrical shaft portion constructed of reduced diameter to define the deformation zone and positioned between the plasticizing screw and a bearing for the driveshaft. As an alternative, the injection drive may be a spindle drive, with the transmission member being part of the spindle drive and having a cylindrical portion of reduced diameter to define the deformation zone.

The portion of the transmission member that is reduced in cross section is easy to make, highly unlikely to fail because the axial force is applied evenly, and is able to change its shape commensurate with an applied load (thrust). The measuring range of a measuring device according to the present invention can be easily expanded or reduced through change of the effective measuring distance.

According to another feature of the present invention, the sensor may be constructed to measure in a contactless manner a change in shape of the deformation zone, such as a change in length and/or thickness of the deformation zone. The sensor may hereby be a laser scanner or an inductive pickup device. This configuration is especially advantageous, when the deformation zone is provided in a rotating transmission member because of the absence of complicated rotating arrangements for transmitting auxiliary energy and measuring signals.

According to another aspect of the present invention, an injection molding machine includes a plasticizing screw, a rotary drive for rotating the screw, an injection drive having a force transmission member for moving the screw in an axial direction and a load detector having a deformation zone which forms part of a transmission member of the injection drive and has a reduced cross section and which elastically deforms in response to a driving force acting on the transmission member, and a sensor for measuring a change in shape of the deformation zone.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a longitudinal section of a main portion of an injection unit of an injection molding machine provided with a pressure measuring device in accordance with a first embodiment of the present invention; and FIG. 2 is a longitudinal section of a main portion of an injection unit of an injection molding machine provided with a pressure measuring device in accordance with a second embodiment of the present invention.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section of a main portion of an injection unit forming part of an otherwise not shown injection molding machine. The injection unit includes a plasticizing barrel 4 which houses a plasticizing screw 5 which is connected to a driveshaft 3. The screw 5 is rotated by a rotary drive 2 and moved in axial direction by an injection drive or thrust generator 1. The combination of injection drive 1 and rotary drive 2 is received in a housing 6 and acts on the driveshaft 3 to thereby transmit the rotational and axial movements to the screw 5.

The injection drive 1 is constructed as spindle drive comprised of a rotatable but axially immobile threaded nut 8, which is operated e.g. by a belt drive 7, and a threaded shaft 9 which carries the nut 8 and is mounted to the housing 6 in such a manner as to be movable in axial direction but constraint from rotating. Thrust is applied by the threaded shaft 9 via a pivot bearing 10 onto the driveshaft 3 and from there is transmitted to the plasticizing screw 5.

The rotary drive 2 includes a journal 12 which is rotatably mounted in the housing 6 and driven by a belt pulley 11. The driveshaft 3 is linked in fixed rotative engagement with the journal 12 via a sliding fit 13 which allows an axial displacement driveshaft 3 in correspondence to the thrust of the injection drive 1. In the filling and metering phase, the plasticizing screw 5 is caused to rotate by the rotary drive 2 and, independently therefrom, is moved translationally in axial direction in the injection phase by the injection drive 1. The axial force applied upon the plasticizing screw 5 is hereby ascertained by a load detector, generally designated by reference numeral 14, as a measure for the melt pressure of plastic melt in the barrel 4.

As shown in FIG. 1, the load detector 14 includes a deformation zone 15 which is formed integral with the driveshaft 3 in the form of a cylindrical shaft portion 16 which is reduced in diameter and positioned between the plasticizing screw 5 and the pivot bearing 10 for the driveshaft 3. In other words, the cylindrical shaft portion 16 is positioned in a region of the driveshaft 3 which is free of any bearings in order to effectively eliminate errors in measurement as a consequence of bearing friction or other interferences. The load detector 14 further includes a pickup device for measuring elastic changes in shape of the shaft portion 16 (deformation zone 15), i.e. changes in length and/or thickness of the shaft portion 16 when subjected to the thrust force. The pickup device operates in a contactless manner and is implemented in the form of a laser scanner which includes a laser transmitter 18 and a laser receiver 19. Both the laser transmitter 18 and the laser receiver 19 are mounted to a sleeve-like attachment 20 of the threaded shaft 9 and operatively connected to an evaluation circuit 22 via auxiliary energy and measuring signal lines 21. The laser scanner 18, 19 operates at high cycle rate of up to 400 Hz and its measuring range can easily be adjusted by means of the evaluation circuit 22. The attachment is closed by a lid 23 to protect the load detector 14 and the deformation zone 15 of the pressure measuring device against external influences while allowing easy access. Suitably, the attachment 20 is detachably secured to the threaded shaft 9.

Referring now to FIG. 2, there is shown a longitudinal section of a main portion of an injection unit of an injection molding machine provided with a pressure measuring device in accordance with a second embodiment of the present invention. Parts corresponding with those in FIG. 1 are denoted by identical reference numerals and not explained again. The description below will center on the differences between the embodiments. In this embodiment, provision is made for a load detector having a deformation zone 15, which forms an integral part of the threaded shaft 9 and is defined by a cylindrical portion of reduced diameter. The load detector further includes a contactless sensor in the form of an inductive pickup device 24 which detects length changes of a plunger 25 in relation to a measuring coil 26 and converts the measured quantity into corresponding measuring signals for input in the evaluation circuit 22. The plunger 25 is hereby secured in the deformation zone 15 to an inside wall of the cylindrical portion of the threaded shaft 9 at a distance to the measuring coil 26 which is secured to an opposite inside wall of the cylindrical portion.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A pressure measuring device for an injection molding machine having a plasticizing screw operated by a rotary drive and an injection drive, said pressure measuring device comprising a load detector having:
   a deformation zone which forms part of a transmission member of the injection drive and has a reduced cross section and which elastically deforms in response to a driving force acting on the transmission member, and
   a sensor non-rotatably connected to a non-rotating threaded shaft of the injection drive for measuring a change in shape of the deformation zone.

2. The pressure measuring device of claim 1, wherein the transmission member is a screw driveshaft provided with a cylindrical shaft portion of reduced diameter to define the deformation zone and is positioned between the plasticizing screw and a bearing for the driveshaft.

3. The pressure measuring device of claim 1, wherein the transmission member is part of the threaded shaft and has a cylindrical portion of reduced diameter in relation to a diameter of the threaded shaft to define the deformation zone.

4. The pressure measuring device of claim 1, wherein the sensor is constructed to measure a change in shape of the deformation zone in a contactless manner.

5. The pressure measuring device of claim 1, wherein the sensor is a laser scanner.

6. The pressure measuring device of claim 1, wherein the sensor is a laser scanner to detect a change in length and/or thickness of the deformation zone.

7. The pressure measuring device of claim 1, wherein the sensor is an inductive pickup device.

8. The pressure measuring device of claim 3, wherein the load detector includes a plunger secured to the cylindrical portion, and a measuring coil secured to the cylindrical portion at a distance to the plunger, said sensor being implemented as an inductive pickup device for measuring a displacement of the plunger in relation to the measuring coil.

9. An injection molding machine, comprising:
a plasticizing screw,
a force transmission member operatively connected to the plasticizing screw;
a rotary drive for rotating the plasticizing screw via the force transmission member;
an injection drive constructed as a spindle drive having a non-rotating threaded shaft acting on the a force transmission member for moving the plasticizing screw in an axial direction, and a threaded nut rotatably mounted onto the threaded shaft; and
a load detector having a deformation zone which forms part of a transmission member of the injection drive and has a reduced cross section and which elastically deforms in response to a driving force acting on the transmission member, and a sensor connected to the threaded shaft for measuring a change in shape of the deformation zone.

10. The injection molding machine of claim 9, wherein the transmission member is a screw driveshaft provided with a cylindrical shaft portion of reduced diameter to define the deformation zone and is positioned between the plasticizing screw and a bearing for the driveshaft.

11. The injection molding machine of claim 9, wherein the transmission member is part of the threaded shaft and has a cylindrical portion of reduced diameter in relation to a diameter of the threaded shaft to define the deformation zone.

12. The injection molding machine of claim 9, wherein the sensor is constructed to measure a change in shape of the deformation zone in a contactless manner.

13. The injection molding machine of claim 9, wherein the sensor is a laser scanner.

14. The injection molding machine of claim 9, wherein the sensor is a laser scanner to detect a change in length and/or thickness of the deformation zone.

15. The injection molding machine of claim 9, wherein the sensor is an inductive pickup device.

16. The injection molding machine of claim 11, wherein the load detector includes a plunger secured to the cylindrical portion, and a measuring coil secured to the cylindrical portion at a distance to the plunger, said sensor being implemented as an inductive pickup device for measuring a displacement of the plunger in relation to the measuring coil.

17. The pressure measuring device of claim 1, wherein the load detector has a stationary evaluation circuit operatively connected to the sensor.

18. The injection molding machine of claim 9, wherein the load detector has a stationary evaluation circuit operatively connected to the sensor.

* * * * *

UNITED STATES PATENT AND TRADEMARK OFFICE
CERTIFICATE OF CORRECTION

PATENT NO. : 7,270,524 B2  Page 1 of 1
APPLICATION NO. : 10/918195
DATED : September 18, 2007
INVENTOR(S) : Holger Schmidt et al.

It is certified that error appears in the above-identified patent and that said Letters Patent is hereby corrected as shown below:

Col. 4, line 45, delete "is";

Col. 5, line 8, delete "a";

Col. 5, line 22, delete "is"

Signed and Sealed this

Twentieth Day of May, 2008

JON W. DUDAS
*Director of the United States Patent and Trademark Office*